US012784594B2

(12) United States Patent
Toyoda

(10) Patent No.: US 12,784,594 B2
(45) Date of Patent: Nov. 3, 2026

(54) ELECTRONIC CONTROL DEVICE AND MANAGEMENT METHOD OF OBJECT

(71) Applicant: Hitachi Astemo, Ltd., Hitachinaka (JP)

(72) Inventor: Hidehiro Toyoda, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 151 days.

(21) Appl. No.: 18/724,002

(22) PCT Filed: Jul. 19, 2022

(86) PCT No.: PCT/JP2022/028120

§ 371 (c)(1),
(2) Date: Jun. 25, 2024

(87) PCT Pub. No.: WO2023/127186

PCT Pub. Date: Jul. 6, 2023

(65) Prior Publication Data

US 2025/0061807 A1 Feb. 20, 2025

(30) Foreign Application Priority Data

Dec. 27, 2021 (JP) ................................. 2021-211927

(51) Int. Cl.
*G08G 1/16* (2006.01)
*G06V 20/58* (2022.01)

(52) U.S. Cl.
CPC ............... *G08G 1/16* (2013.01); *G06V 20/58* (2022.01)

(58) Field of Classification Search
CPC ................................ G08G 1/16; G06V 20/58
See application file for complete search history.

(56) References Cited

U.S. PATENT DOCUMENTS 11,948,461 B2 * 4/2024 Watanabe ................. G06T 7/70
2019/0251374 A1 * 8/2019 Sakai ........................ G06T 7/70
(Continued)

FOREIGN PATENT DOCUMENTS

CN 120573096 A * 9/2025
JP 2011248870 A * 12/2011
(Continued)

OTHER PUBLICATIONS

International Search Report with English Translation of International Patent Application No. PCT/JP2022/028120 dated Sep. 6, 2022 (6 pages).

*Primary Examiner* — Mary Cheung
(74) *Attorney, Agent, or Firm* — Foley & Lardner LLP

(57) ABSTRACT

An electronic control device includes: an object recognition unit that recognizes surrounding objects based on external environment information acquired by an external environment sensor; an obstacle object generation unit that generates an obstacle object regarding an object that generates a blind spot region by shielding observation by the external environment sensor among the recognized objects; and a blind spot object management unit that manages, as a blind spot object, a blind spot region generated by the obstacle object, in which the object recognition unit generates solid object information regarding an object that can enter and exit the blind spot region among the recognized objects, and the blind spot object management unit associates a solid object that has entered the blind spot region with a blind spot object in the blind spot region, and cancels association of a solid object that has exited the blind spot region with a blind spot object in the blind spot region.

5 Claims, 5 Drawing Sheets

(56) References Cited

U.S. PATENT DOCUMENTS

| | | | | |
|---|---|---|---|---|
| 2020/0111369 | A1* | 4/2020 | Cho | G01S 15/931 |
| 2020/0264622 | A1 | 8/2020 | Tokumochi | |
| 2023/0022104 | A1* | 1/2023 | Urano | G01S 13/931 |

FOREIGN PATENT DOCUMENTS

| | | | | | |
|---|---|---|---|---|---|
| JP | 2012104029 | A | * | 5/2012 | |
| JP | 2013-011939 | A | | 1/2013 | |
| JP | 2018101295 | A | * | 6/2018 | G06V 10/809 |
| JP | 2020-135215 | A | | 8/2020 | |
| JP | 2022123690 | A | * | 8/2022 | |
| JP | 2023090539 | A | * | 6/2023 | |
| WO | WO-2018/216066 | A1 | | 11/2018 | |
| WO | WO-2018198186 | A1 | * | 11/2018 | G08G 1/16 |

* cited by examiner

| 2121 | 2122 | 2123 | 2124 | 2125 | 2126 | 2127 | 2128 |
|---|---|---|---|---|---|---|---|
| ID | TYPE | SHAPE | BOTTOM SURFACE SHAPE | BASE AREA ($m^2$) | VOLUME ($m^3$) | ASPECT | TTL |
| Obs1 | AUTOMOBILE | REGULAR CUBE | 2x5 | 10 | 20 | MOVING BODY | |
| Obs2 | STRUCTURE | IRREGULAR CUBE | P0,P1,P2 .. | 100 | — | STILL OBJECT | |
| ... | | | | | | | |

OBSTACLE OBJECT DB 212

| 2131 | 2132 | 2133 | 2134 | 2135 | 2136 |
|---|---|---|---|---|---|
| ID | TYPE | BOTTOM SURFACE SHAPE (w x d) | BASE AREA ($m^2$) | VOLUME ($m^3$) | TTL |
| S1 | AUTOMOBILE | 1.8 x 4.5 | 8.1 | 13.0 | |
| S2 | PEDESTRIAN | 0.5 x 1.0 | 0.5 | 1.0 | |
| ... | | | | | |

SOLID OBJECT DB 213

FIG. 5

| ID (2141) | SHAPE (2142) | BASE AREA ($m^2$) (2143) | VOLUME ($m^3$) (2144) | ASSOCIATION OBSTACLE OBJECT (2145) | CONTAINED OBJECT (2146) | TTL (2147) |
|---|---|---|---|---|---|---|
| BA1 | P0 (x00, y00, z00), P1 (x01, y01, z01), ••• P7 (x07, y07, z07) | 100 | 200 | Obs1 | V1, S1 | |
| BA2 | P0 (x10, y10, z10), P1 (x11, y11, z11), ••• P7 (x17, y17, z17) | 1000 | — | Obs2 | V2, S2 | |
| ••• | | | | | | |

BLIND SPOT OBJECT DB 214

FIG. 6

| ID (2151) | TYPE (2152) | BOTTOM SURFACE SHAPE (w x d) (2153) | BASE AREA ($m^2$) (2154) | VOLUME ($m^3$) (2155) |
|---|---|---|---|---|
| V1 | AUTOMOBILE | 1.8 x 4.5 | 8.1 | 13.0 |
| V2 | PEDESTRIAN | 0.5 x 1.0 | 0.5 | 1.0 |
| ••• | | | | |

VIRTUAL SOLID OBJECT DB 215

ELECTRONIC CONTROL DEVICE AND MANAGEMENT METHOD OF OBJECT

INCORPORATION BY REFERENCE

This application claims priority to Japanese Patent Application No. 2021-211927 filed on Dec. 27, 2021, the contents of which are incorporated herein by reference.

TECHNICAL FIELD

The present invention relates to an electronic control device, and particularly relates to a technique of managing an object outside a vehicle in an in-vehicle electronic control device.

BACKGROUND ART

In automatic driving and advanced driving assistance, an object outside a vehicle is detected by a sensor to control the vehicle and assist a driver.

As background art of the present technical field, there are the following patent literatures. PTL 1 (JP 2011-248870 A) describes a dead angle area detection device that is mounted on a vehicle and detects a dead angle area showing the area to be dead angle around own vehicle, the dead angle area detection device including: an object information obtaining means that obtains object information showing the shape including a height of an object existing around an own vehicle and the distance to the object; and a dead angle area detection means that detects a size of dead angle area that is an area to be dead angle by the object based on the obtained object information.

PTL 2 (JP 2020-135215 A) discloses an action control method employed in a vehicle having an environment recognition unit that recognizes a traveling environment, and controlling action of the vehicle, the action control method including, in processing executed by at least one processor, the steps of: identifying a blind area which lies at a blind angle of the environment recognition unit along a traveling route of the vehicle, which is designated to include rightward/leftward turn or lane change; determining a possibility that a moving object may rush from the blind area to the traveling route; implementing a possibility lowering action of bringing the rushing possibility to a lower level when there is a possibility of rushing from the blind area; and after start of the possibility lowering action, implementing traveling action of the vehicle along the traveling route.

SUMMARY OF INVENTION

Technical Problem

A blind spot region (sometimes called occlusion) caused by an obstacle is on the back side of the obstacle, and therefore the size of the obstacle and an object hidden by the obstacle cannot be detected. Furthermore, it is difficult to estimate the risk inherent in the blind spot region. For example, an object hidden behind an obstacle may suddenly run out into the course of a vehicle. Furthermore, it is difficult to accurately estimate the size and shape of a blind spot region that does not include an obstacle that hinders observation of an object.

An object of the present invention is to accurately estimate an object hidden in a blind spot region, and accurately predict a risk caused by the hidden object to improve traveling safety of a vehicle.

Solution to Problem

A representative example of the invention disclosed in the present application is as follows. That is, an electronic control device includes: an object recognition unit that recognizes surrounding objects based on external environment information acquired by an external environment sensor; an obstacle object generation unit that generates an obstacle object regarding an object that generates a blind spot region by shielding observation by the external environment sensor among the recognized objects; and a blind spot object management unit that manages, as a blind spot object, a blind spot region generated by the obstacle object, in which the object recognition unit generates solid object information regarding an object that can enter and exit the blind spot region among the recognized objects, and the blind spot object management unit associates a solid object that has entered the blind spot region with a blind spot object in the blind spot region, and cancels association of a solid object that has exited the blind spot region with a blind spot object in the blind spot region.

Advantageous Effects of Invention

According to one aspect of the present invention, an object hidden in a blind spot region can be accurately predicted. Problems, configurations, and effects other than those described above will be made clear by the following description of examples.

BRIEF DESCRIPTION OF DRAWINGS

FIG. 5 is a view illustrating a configuration example of a blind spot object database.

FIG. 6 is a view illustrating a configuration example of a virtual solid object database.

DESCRIPTION OF EMBODIMENTS

An electronic control device 10 of an example of the present invention detects, among observed objects, an obstacle that generates a blind spot region in which observation by an external environment sensor 32 is hindered, and chronologically manages solid objects that enter and exit the blind spot region. That is, the object recognized once is continuously managed even if it enters the blind spot region. The area or volume of the blind spot region is accurately grasped, and a virtual solid object such as a pedestrian, a motorcycle, or an automobile contained in the blind spot region is set in accordance with the shape or size of the blind spot region. Then, a risk of hindering the advance of an own vehicle is calculated in accordance with the number and content of objects contained in the blind spot region.

Figure 1:
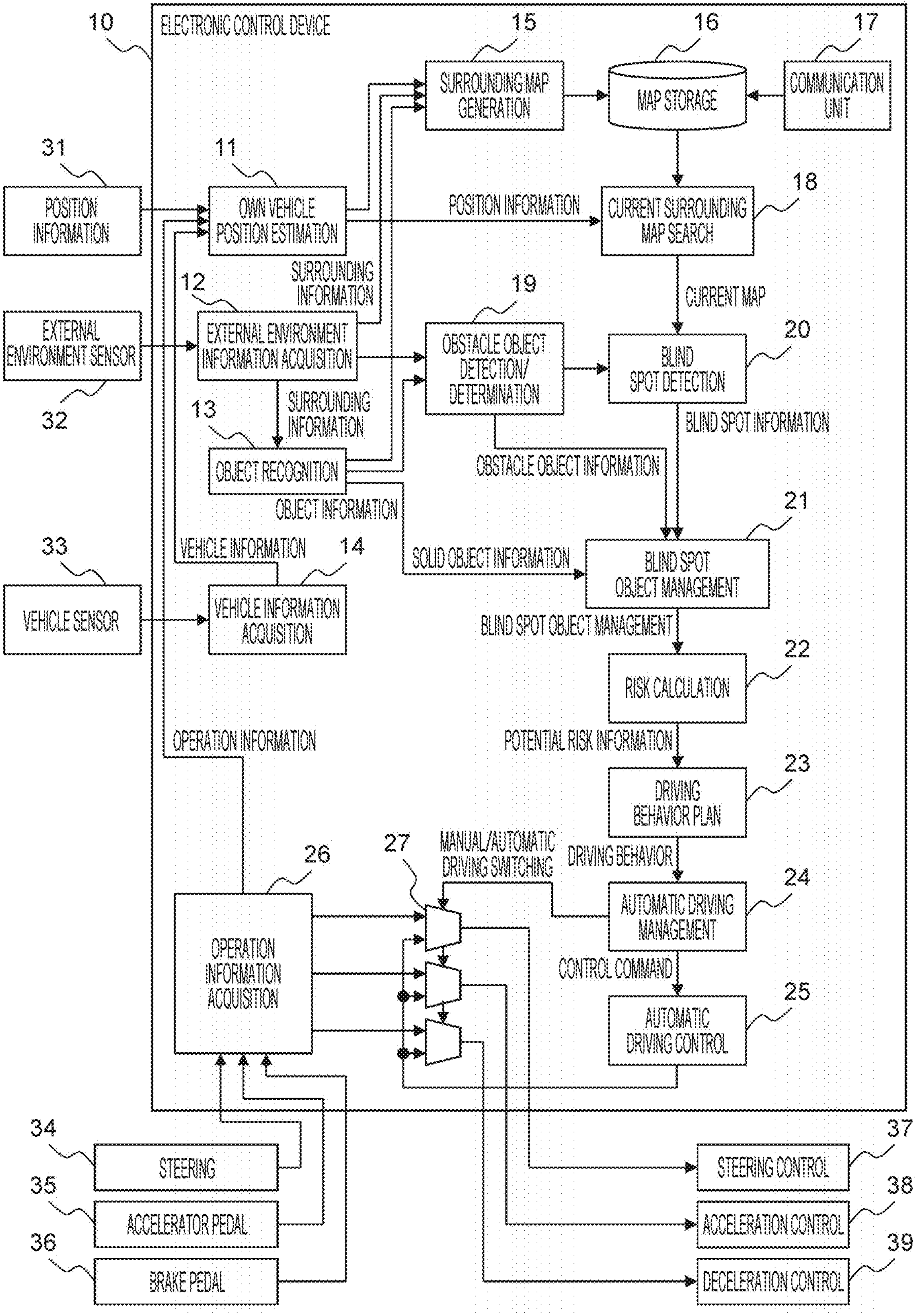
FIG. 1 is a block diagram illustrating a logical configuration of an electronic control device of an example of the present invention.

FIG. 1 is a block diagram illustrating a logical configuration of the electronic control device 10 of the example of the present invention.

The electronic control device 10 of the present example includes an arithmetic device, a storage device, and a communication interface. The arithmetic device is a processor (e.g., CPU) that executes a program stored in the storage device. The arithmetic device operates as a functional unit that provides various functions by executing a predetermined program. The storage device includes a nonvolatile storage region and a volatile storage region. The nonvolatile storage region includes a program region for storing a program executed by the arithmetic device and a data region for temporarily storing data used when the arithmetic device executes the program. The volatile storage region stores data used when the arithmetic device executes the program. The communication interface is connected to another electronic control device via a network such as CAN or Ethernet.

The electronic control device 10 includes an own vehicle position estimation unit 11, an external environment information acquisition unit 12, an object recognition unit 13, a vehicle information acquisition unit 14, a surrounding map generation n unit 15, a map storage unit 16, a communication unit 17, a current surrounding map search unit 18, an obstacle object detection/determination unit 19, a blind spot detection unit 20, a blind spot object management unit 21, a risk calculation unit 22, a driving behavior planning unit 23, an automatic driving management unit 24, an automatic driving control unit 25, an operation information acquisition unit 26, and a manual/automatic driving switching unit 27.

Position information 31, external environment information from the external environment sensor 32, and vehicle behavior information from a vehicle sensor 33 are input to the electronic control device 10. The position information 31 is position information (information on latitude/longitude and relative position) output from a GNSS unit or an inertial navigation unit (not illustrated). The external environment sensor 32 is a sensor that observes a state outside the vehicle and outputs external environment information, and is, for example, a camera, a radar, a LiDAR, or the like. The vehicle sensor 33 is a sensor that measures the behavior (such as acceleration, speed, roll, pitch, and yaw) of the vehicle. Furthermore, an operation angle from a steering device 34, an operation amount of an accelerator pedal 35, and an operation amount of a brake pedal 36 are input to the electronic control device 10.

The own vehicle position estimation unit 11 estimates the position of the vehicle from the position information 31 input to the electronic control device 10, vehicle information output from the vehicle information acquisition unit 14, and operation information output from the operation information acquisition unit 26. The external environment information acquisition unit 12 generates surrounding information from observation results (captured images, point cloud data, and the like) by the external environment sensor 32. The object recognition unit 13 recognizes an object included in the surrounding information generated by the external environment information acquisition unit 12, and generates solid object information representing the recognized object. The solid object information is a pedestrian, a motorcycle, an automobile, a wall, a guardrail, or the like recognized as a result of observation by the external environment sensor 32, and is a moving object and a fixed object that have clear attributes such as a volume or a bottom area and actually exist. The attribute of the solid object information is preferably maintained even in a case where observation becomes impossible due to movement of the solid object into the blind spot region or deformation of the blind spot region itself due to a change in the relative position between the own vehicle and the obstacle. The vehicle information acquisition unit 14 generates vehicle information indicating the state of the vehicle from the vehicle behavior information from the vehicle sensor 33.

The surrounding map generation unit 15 generates a map around the vehicle from the vehicle position estimated by the own vehicle position estimation unit 11, the surrounding information generated by the external environment information acquisition unit 12, and the object information generated by the object recognition unit 13. The communication unit 17 wirelessly communicates with a map distribution server (not illustrated) to acquire map update information or update a risk calculation parameter (calculation formula). The map storage unit 16 stores the surrounding map generated by the surrounding map generation unit 15 and the map acquired from the server via the communication unit 17. The map stored in the map storage unit 16 preferably has accuracy higher (e.g., accuracy of about several 10 cm) than that of a map used by a navigation device, and can distinguish between a roadway and a sidewalk or can distinguish between lanes, and may be a high-accuracy map for automatic driving, a map generated from an observation result of the own vehicle, or a map obtained by updating the map acquired from the map distribution server with the surrounding map generated by the surrounding map generation unit 15. The current surrounding map search unit 18 acquires, from the map storage unit 16, a current location map around the vehicle position estimated by the own vehicle position estimation unit 11.

The obstacle object detection/determination unit 19 selects an obstacle object that hinders observation from the own vehicle from the surrounding information generated by the external environment information acquisition unit 12 and the object information generated by the object recognition unit 13, and generates obstacle object information. From the current location map acquired by the current surrounding map search unit 18 and the obstacle object information generated by the obstacle object detection/determination unit 19, the blind spot detection unit 20 calculates a blind spot region in which observation is hindered, and generates blind spot information. In an observation result from one direction of the first time, the shape of an obstacle object and an object in the blind spot region cannot be recognized, and thus it is difficult to accurately estimate the net shape of the blind spot region. At this time, using the map information of the current position, the blind spot detection unit 20 calculates a net blind spot region excluding the region occupied by the obstacle object. The net shape of the blind spot region may be accurately estimated by subtracting the shape of the obstacle object or the object in the blind spot region estimated using observation results of a plurality of times.

The blind spot object management unit 21 generates blind spot object information representing a blind spot region from the blind spot information generated by the blind spot detection unit 20, the obstacle object information generated by the obstacle object detection/determination unit 19, and the solid object information generated by the object recognition unit 13. Details of the blind spot object management unit 21 will be described with reference to FIGS. 2 and 7.

The blind spot object is an object for chronologically continuously managing a blind spot region having an indefinite shape generated by an obstacle object that hinders observation from the own vehicle. The blind spot object includes a polygon in a two-dimensional space, and a polygonal prism or a polygon in a three-dimensional space, has a configuration that varies depending on whether the map to be used is a two-dimensional map or a three-dimensional map, and has a shape that changes with time. The blind spot object may be represented by vertex coordinates of a plane or a solid so that the area can be calculated in a two-dimensional space and the volume can be calculated in a three-dimensional space. The blind spot object is associated with an obstacle object generating the blind spot region by an association obstacle object 2145 in a blind spot object database 214. As the obstacle object generating a blind spot region, an object that is observed by the external environment sensor 32 and is recognized by the object recognition unit 13 (a non-moving building, a moving vehicle, and the like), or an object that is observed by the external environment sensor 32 but whose type cannot be recognized by the object recognition unit 13 may be an obstacle object of an unknown type as long as the obstacle object has a certain shape.

The risk calculation unit 22 calculates a traveling risk level on the course of the vehicle from the blind spot object information generated by the blind spot object management unit 21, and generates potential risk information indicating the traveling risk level. That is, since the blind spot object information includes association with the solid object information and the virtual solid object information contained in the blind spot region, a risk value that is a possibility of causing trouble in traveling of the vehicle by the solid object and the virtual solid object is calculated. For example, a possibility that a pedestrian (solid object) behind a parked vehicle will run out into a roadway or a possibility that a vehicle (virtual solid object) that is possibly present behind a building will come out into a lane is calculated. For example, the risk value is preferably calculated by the density of objects for each type contained in the blind spot object. A high risk place such as an entrance and a gap with a parked vehicle is preferably multiplied by a predetermined coefficient to increase the risk value. Then, the calculated risk value is assigned to each divided region of the map to generate potential risk information.

The driving behavior planning unit 23 generates a driving: behavior from the potential risk information generated by the risk calculation unit 22. For example, a low-risk driving behavior can be generated by selecting a region with a low risk around the course of the vehicle. The automatic driving management unit 24 generates a control command for automatic driving and a manual driving/automatic driving switching signal from the driving behavior generated by the driving behavior planning unit 23. The automatic driving control unit 25 generates a steering control signal 37, an acceleration control signal 38, and a deceleration control signal 39 in accordance with the control command generated by the automatic driving management unit 24. The operation: information acquisition unit 26 acquires the operation angle from the steering device 34, the operation amount of the accelerator pedal 35, and the operation amount of the brake pedal 36, and generates operation information.

The manual/automatic driving switching unit 27 switches between manual driving and automatic driving in accordance with the manual driving/automatic driving switching signal generated by the automatic driving management unit 24. For example, in the case of manual driving, signal circuits are switched such that the pieces of operation information generated from the steering device 34, the accelerator pedal 35, and the operation amount of the brake pedal 36 are output as the steering control signal 37, the acceleration control signal 38, and the deceleration control signal 39, respectively. On the other hand, in the case of automatic driving, the signal circuits are switched such that the steering control signal 37, the acceleration control signal 38, and the deceleration control signal 39 generated by the automatic driving control unit 25 are output.

Figures 2, 3, 4:
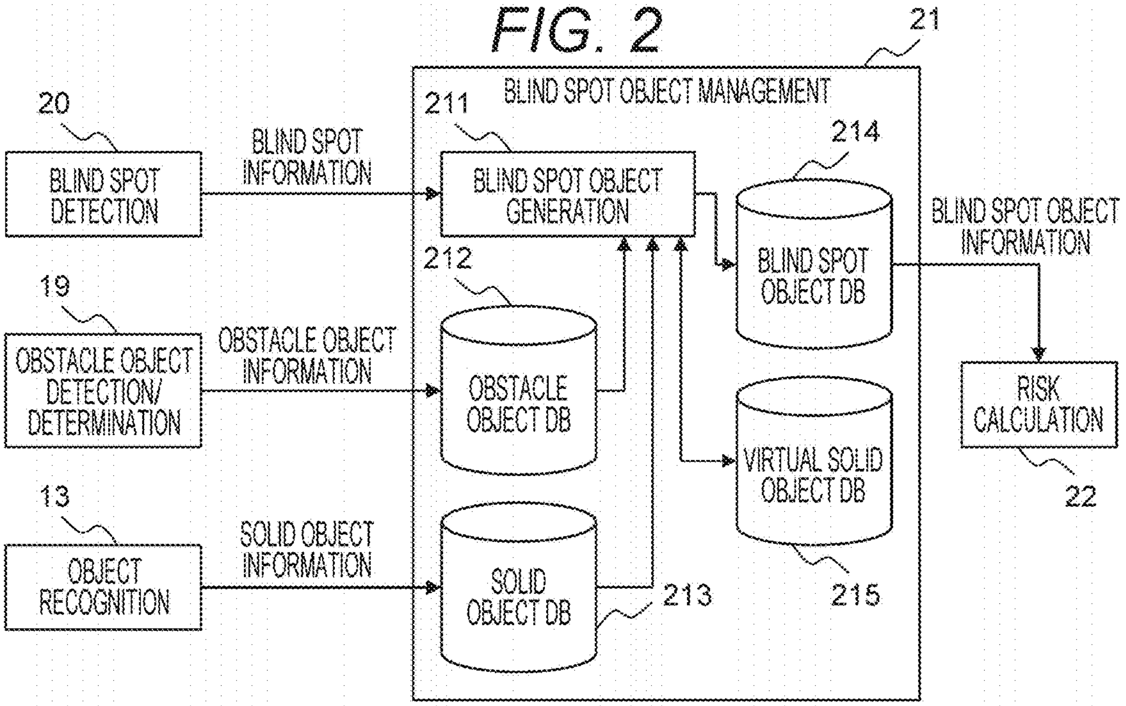
FIG. 2 is a block diagram illustrating a configuration of a blind spot object management unit.
FIG. 3 is a view illustrating a configuration example of an obstacle object database.
FIG. 4 is a view illustrating a configuration example of a solid object database.

FIG. 2 is a block diagram illustrating the configuration of the blind spot object management unit 21.

The blind spot object management unit 21 includes a blind spot object generation unit 211, an obstacle object database 212, a solid object database 213, the blind spot object database 214, and a virtual solid object database 215. To the blind spot object management unit 21, the blind spot information is input from the blind spot detection unit 20, the obstacle object information is input from the obstacle object detection/determination unit 19, and the solid object information is input from the object recognition unit 13. The blind spot object management unit 21 outputs blind spot object information.

The blind spot object generation unit 211 generates blind spot object information by using blind spot information, obstacle object information, and solid object information that are input, and stores the generated blind spot object information into the blind spot object database 214. Details of the processing executed by the blind spot object generation unit 211 will be described with reference to FIG. 7. The obstacle object database 212 is a database in which obstacle objects are registered, and the details thereof will be described with reference to FIG. 3. The solid object database 213 is a database in which solid objects are registered, and the details thereof will be described with reference to FIG. 4. The blind spot object database 214 is a database in which blind spot objects are registered, and the details thereof will be described with reference to FIG. 5. The virtual solid object database 215 is a database in which virtual solid objects are registered, and the details thereof will be described with reference to FIG. 6. The virtual solid object is a virtual moving object that can exist in the blind spot region. In the virtual solid object, a type (pedestrian, motorcycle, or automobile) and attribute similar to those of the solid object, and an average shape, bottom area, or volume for each type is determined.

FIG. 3 is a view illustrating a configuration example of the obstacle object database 212.

The obstacle object database 212 is a database in which obstacle objects are registered, and includes data of an ID 2121, a type 2122, a shape 2123, a bottom surface shape 2124, a bottom area 2125, a volume 2126, a manner 2127, and time to live (TTL) 2128.

The ID 2121 is identification information for uniquely identifying the obstacle object. The type 2122 is a type of the obstacle object, and is, for example, an automobile, a structure, or the like. The shape 2123 is a shape of the obstacle object, and is, for example, a regular cube, an irregular cube, or the like. The bottom surface shape 2124 is a shape of the bottom surface of the obstacle object, and is represented by the vertical and horizontal sizes of the bottom surface in a regular cube, for example, and coordinates constituting the bottom surface in an irregular cube, or the like. The bottom area 2125 is a bottom area of the obstacle object and is expressed in square meters. The volume 2126 is a volume of the obstacle object and is expressed in cubic meters. The manner 2127 is an attribute of the obstacle object, and is, for example, a dynamic object that moves or changes in shape, a stationary object that does not move, or the like. The TTL 2128 is a counter value used for organizing obstacle objects detected in the past. When an obstacle object is detected, an upper limit value is set, and when the obstacle object is not detected, subtraction is performed.

FIG. 4 is a view illustrating a configuration example of the solid object database 213.

The solid object database 213 is a database in which solid objects are registered, and includes data of an ID 2131, a type 2132, a bottom surface shape 2133, a bottom area 2134, a volume 2135, and TTL 2136.

The ID 2131 is identification information for uniquely identifying the solid object. The type 2132 is a type of the solid object, and is, for example, a pedestrian, a motorcycle, an automobile, or the like. The bottom surface shape 2133 is a shape of the bottom surface of the solid object, and is represented by, for example, the vertical and horizontal sizes of a rectangle occupied by the solid object and coordinates constituting the bottom surface. The bottom area 2134 is a bottom area of the solid object and is expressed in square meters. The volume 2135 is a volume of the solid object and is expressed in cubic meters. The TTL 2136 is a counter value used for organizing solid objects detected in the past. When a solid object is detected, an upper limit value is set, and when the solid object is not detected, subtraction is performed.

FIG. 5 is a view illustrating a configuration example of the blind spot object database 214.

The blind spot object database 214 is a database in which blind spot objects are registered, and includes data of an ID 2141, a shape 2142, a bottom area 2143, a volume 2144, the association obstacle object 2145, a contained object 2146, and TTL 2147.

The ID 2141 is identification information for uniquely identifying the blind spot object. The shape 2142 is a shape of the blind spot object, and is represented by, for example, vertex coordinates of a solid occupied by the blind spot object. The bottom area 2143 is a bottom area of the blind spot object (size of the blind spot region) and is expressed in square meters. The volume 2144 is a volume of the blind spot object and is expressed in cubic meters. The association obstacle object 2145 is identification information of an obstacle object that generates the blind spot object, that is, hinders observation of the blind spot region of the blind spot object from the own vehicle. The contained object 2146 is identification information of the virtual solid object contained in the blind spot object. The TTL 2147 is a counter value used for organizing blind spot objects detected in the past. When a blind spot object is detected, an upper limit value is set, and when the blind spot object is not detected, subtraction is performed.

FIG. 6 is a view illustrating a configuration example of the virtual solid object database 215.

The virtual solid object database 215 is a database in which virtual solid objects are registered, and includes data of an ID 2151, a type 2152, a bottom surface shape 2153, a bottom area 2154, and a volume 2155.

The ID 2151 is identification information for uniquely identifying the virtual solid object. The type 2152 is a type of the virtual solid object, and is, for example, a pedestrian, a motorcycle, an automobile, or the like. The bottom surface shape 2153 is a shape of the bottom surface of the virtual solid object, and is represented by, for example, the vertical and horizontal sizes of a rectangle occupied by the virtual solid object and coordinates constituting the bottom surface. The bottom area 2154 is a bottom area of the virtual solid object and is expressed in square meters. The volume 2155 is a volume of the virtual solid object and is expressed in cubic meters.

Figure 7:
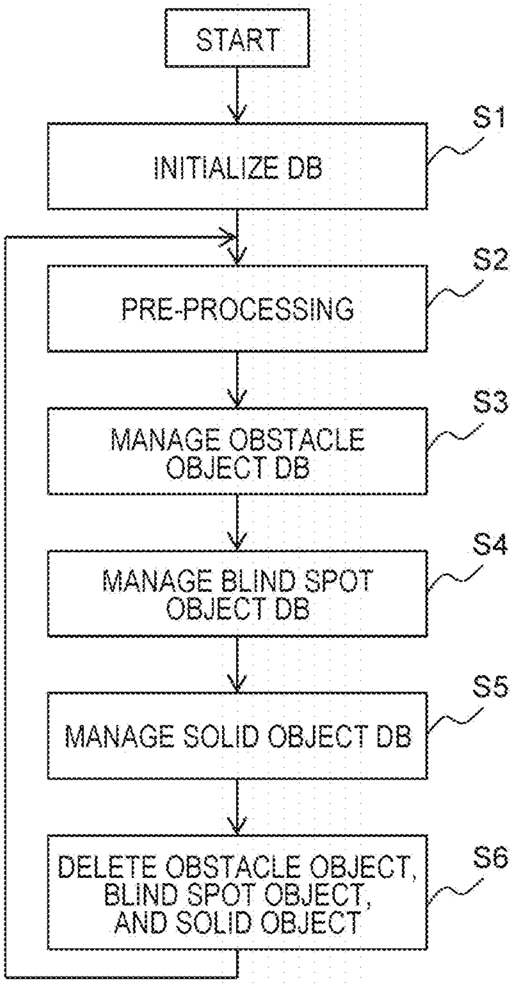
FIG. 7 is a flowchart of blind spot object management processing.

FIG. 7 is a flowchart of the blind spot object management processing executed by the blind spot object management unit 21, that is, the blind spot object generation unit 211.

The electronic control device 10 is activated when the ignition of the vehicle is on, the blind spot object management unit 21 is activated, and the processing of steps S2 to S6 are repeatedly executed at predetermined time intervals. First, the blind spot object generation unit 211 initializes the obstacle object database 212, the solid object database 213, and the blind spot object database 214 (step S1). For example, all the data recorded in each database is erased.

Next, the blind spot object generation unit 211 executes pre-processing (step S2). This pre-processing is executed as a pre-stage of processing in and after step S3, and may be executed in synchronization with the processing in and after step S3 or may be repeatedly executed at an independent timing. Specifically, the blind spot object generation unit 211 searches for a surrounding map of the current position and acquires the surrounding map of the current position. Then, the blind spot object generation unit 211 determines that an object having a size larger than a predetermined size is an obstacle object from information on surrounding objects described in the acquired surrounding map and the object information recognized by the external environment sensor 32. The blind spot object generation unit 211 determines a solid object from the object recognition result (solid object information) by the object recognition unit 13. Furthermore, the blind spot object generation unit 211 calculates a blind spot region from the current position (observation point) based on the obstacle object information from the obstacle object detection/determination unit 19 and the blind spot information detected from the current location map by the blind spot detection unit 20.

Next, the blind spot object generation unit 211 updates the obstacle object database 212 (step S3). Specifically, the blind spot object generation unit 211 records a newly detected obstacle object into the obstacle object database 212 (step S3). Note that when the detected obstacle object is recorded in the obstacle object database 212, the blind spot object generation unit 211 sets the TTL 2128 of the record to the upper limit value.

Next, the blind spot object generation unit 211 updates the blind spot object database 214 (step S4). Specifically, the blind spot object generation unit 211 searches the obstacle object database 212, extracts an obstacle object detected by the blind spot detection unit 20 and generating a blind spot region larger than a predetermined size, and newly registers, into the blind spot object database 214, a record of the blind spot region generated by the obstacle object.

Then, as the initial setting of the record of the newly registered blind spot region, the virtual solid object contained in the blind spot object is determined in accordance with the size of the blind spot object. The virtual solid object contained in the blind spot object is preferably determined by the type and area of the blind spot object. Specifically, the number of virtual solid objects contained in the blind spot object of a unit area is determined for each type of blind spot object (sidewalk, roadway, and the like) and each type of virtual solid object, and the virtual solid object to be contained can be determined by the type and area of the blind spot object to be registered. The virtual solid object to be contained may be determined by the number (density) per unit area of solid objects around the blind spot object. This is because it is inferred that the solid objects exist in the blind spot object at the same density as the surroundings. Furthermore, the virtual solid object to be contained may be determined depending on the shape of the blind spot object.

For example, a blind spot object having such a narrow width that no vehicle can exist may be determined to contain not a virtual solid object of a vehicle but a virtual solid object of a pedestrian. Then, the determined virtual solid object is set in the virtual solid object database 215, and link information for associating the blind spot object with the virtual solid object is recorded. The density of the virtual solid object may be changed in accordance with the position of the blind spot object. For example, by arranging many virtual solid objects in a blind spot object in the vicinity of a high risk place such as an entrance and a gap with a parked vehicle, it is possible to increase the risk value of the high risk place calculated by the risk calculation unit 22.

A solid object observed in the vicinity of a blind spot object may enter the blind spot object, and entry and exit of the blind spot object by the solid object is grasped from the observation result of the external environment sensor 32, and the solid object contained in the blind spot region is managed.

An upper limit of the number of solid objects and virtual solid objects that can be contained in the blind spot object is preferably set so that a large number of solid objects do not remain in the blind spot object. When the bottom area or the volume of the blind spot object decreases and the total area or the total volume of the virtual solid objects and the solid objects to be contained exceeds the bottom area or the volume of the blind spot object, the virtual solid objects are reduced. As the blind spot object becomes smaller, the virtual solid object decreases, whereby the accuracy of risk prediction can be improved.

At the time of new registration of a blind spot object, the TTL 2147 of the blind spot object is set to an upper limit value. Since there is a low possibility that a blind spot object greatly deviates from an observation range beyond a predetermined threshold value is restored to the observation range, the blind spot object may be erased. However, if the blind spot object deviating from the observation range is maintained just for the time until the TTL 2147 becomes zero, it is not necessary to re-register the blind spot object into the blind spot object database 214 even if the obstacle object generating the blind spot region is restored to the observation range and re-observed. In this case, it is necessary to determine the identity between the blind spot object deviating from the observation range and the blind spot object re-recognized in the observation range. Therefore, the feature amount of the obstacle object associated with the blind spot object is preferably recorded in the obstacle object database 212 and compared with the feature amount of the observed obstacle object to determine whether the observed obstacle object is a newly observed obstacle object or a re-observed obstacle object. Since there is a low possibility that a blind spot object greatly deviates from a range where the blind spot object can move in a predetermined time in the advance direction of the own vehicle (e.g., moving rearward relative to the own vehicle) is restored to the observation range, the blind spot object may be erased. The blind spot object in the observation range may be provided with a lifetime of a predetermined time (e.g., 10 seconds), the blind spot object may be deleted from the blind spot object database 214 after the lapse of the lifetime after being observed for the first time, and the observed blind spot object may be registered in the blind spot object database 214 unless the observed blind spot object has been recorded in the blind spot object database 214. In this case, the blind spot object is refreshed for each lifetime, and therefore life/death management by TTL becomes no longer necessary.

Next, the blind spot object generation unit 211 updates the solid object database 213 (step S5). Specifically, in a case where a detected solid object enters a blind spot region managed as a blind spot object in the blind spot object database with time, link information for associating the blind spot object with the virtual solid object is recorded in the blind spot object database 214. In a case where the solid object associated with the blind spot object exits the blind spot object, the association (link) between the solid object and the blind spot object is deleted.

Next, the blind spot object generation unit 211 deletes the obstacle object, the blind spot object, and the solid object (step S6). Specifically, the blind spot object generation unit 211 determines whether an obstacle object has been observed, sets the TTL 2128 to the upper limit value if the obstacle object is observed, and decreases the TTL 2128 by a predetermined value (e.g., 1) if the obstacle object is not observed. The blind spot object generation unit 211 deletes, from the obstacle object database 212, the obstacle object in which the TTL 2128 becomes equal to or less than zero. Then, the blind spot object associated with the deleted obstacle object is deleted from the blind spot object database 214, and the virtual solid object associated with the deleted blind spot object is deleted from the virtual solid object database 215. Furthermore, the blind spot object generation unit 211 determines whether a solid object has been observed, sets the TTL 2136 to the upper limit value if the solid object is observed, and decreases the TTL 2136 by a predetermined value (e.g., 1) if the solid object is not observed. Then, the solid object in which the TTL 2136 becomes equal to or less than zero is deleted from the solid object database 213. Note that since the solid object is not observed while being contained in the blind spot object, the solid object is not deleted even if the TTL reaches a lower limit.

The blind spot object generation unit 211 determines whether an obstacle object that generates a blind spot object has been observed, sets the TTL 2147 of the blind spot object database 214 to the upper limit value if the obstacle object is observed, and decreases the TTL 2147 by a predetermined value (e.g., 1) if the obstacle object is not observed. The blind spot object generation unit 211 deletes, from the blind spot object database 214, the blind spot object in which the TTL 2147 becomes equal to or less than zero. Then, the virtual solid object associated with the deleted blind spot object is deleted from the virtual solid object database 215.

Note that since the blind spot object generated by an obstacle object disappears due to disappearance of the obstacle object, it is sufficient to provide the TTL to one of the obstacle object and the blind spot object.

Figure 8:
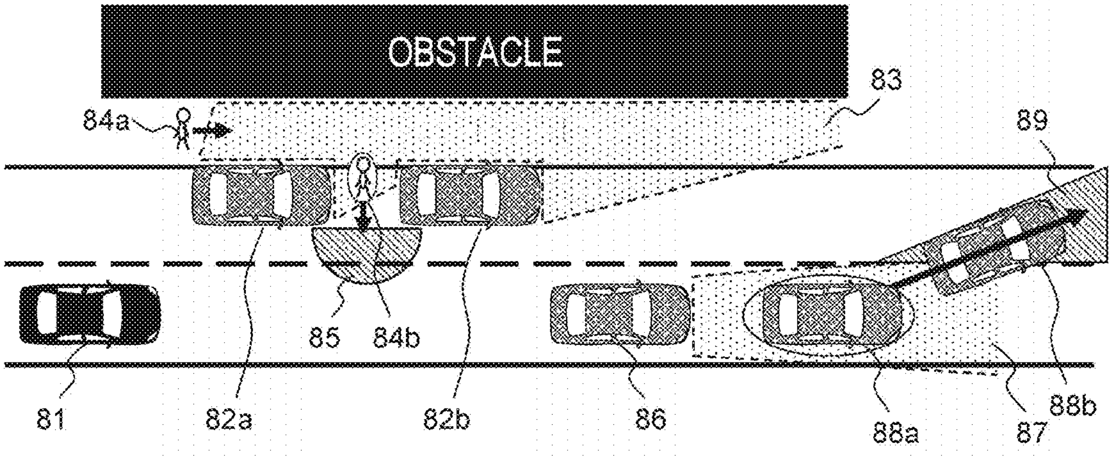
FIG. 8 is a view illustrating an example of an object processed by the electronic control device of the present example.

FIG. 8 is a view illustrating an example of an object processed by the electronic control device 10 of the present example.

A blind spot region 83 is generated on the farther side of parked vehicles 82*a* and 82*b* as viewed from an own vehicle 81. The blind spot region 83 is determined in a range excluding the parked vehicles 82*a* and 82*b* and the obstacle at the rear, which are obstacle objects. A solid object (pedestrian) 84*a* that is about to enter the blind spot region 83 is observed from the own vehicle 81. Upon entering the blind spot region 83, the solid object (pedestrian) 84*a* becomes a contained object 84*b* in the blind spot object 83, and association information of the blind spot object 83 and the solid object 84*a* is recorded in the contained object 2146 of the blind spot object database 214. Thereafter, when the contained object (pedestrian) 84*b* exits the blind spot object 83 from between the parked vehicles 82*a* and 82*b*, the record of the contained object 2146, which is the association information of the blind spot object 83 and the contained object 84*b*, is deleted. When the contained object (pedestrian) 84*b* exits the blind spot object 83 from between the parked vehicles 82*a* and 82*b*, there is a risk of coming into contact with the own vehicle 81, and therefore, a region 85 adjacent to the blind spot object 83 between the parked vehicles 82*a* and 82*b* is calculated as a high risk region.

A blind spot region 87 is generated in front of a preceding vehicle 86 as viewed from the own vehicle 81. Although there is a further preceding vehicle 88*a* in the blind spot region 87, the preceding vehicle 88*a* cannot be observed from the own vehicle 81. Therefore, the virtual solid object (preceding vehicle) 88*a* that can exist in the blind spot object (blind spot region) 87 is generated, and association information of the blind spot object 87 and the virtual solid object 88*a* is recorded in the contained object 2146 of the blind spot object database 214. Thereafter, when changing the lane, a virtual solid object 88*b* exits from the blind spot region 87 in front of the preceding vehicle 86, and the record of the contained object 2146, which is the association information of the blind spot object 87 and the virtual solid object 88*a*, is deleted. When the contained object (preceding vehicle) 88*b* exits the blind spot region 87 generated by the preceding vehicle 86, the course of the own vehicle 81 possibly needs to be changed, and therefore, an adjacent lane region 89 in front of the preceding vehicle 86 is calculated as a high risk area.

Figure 9:
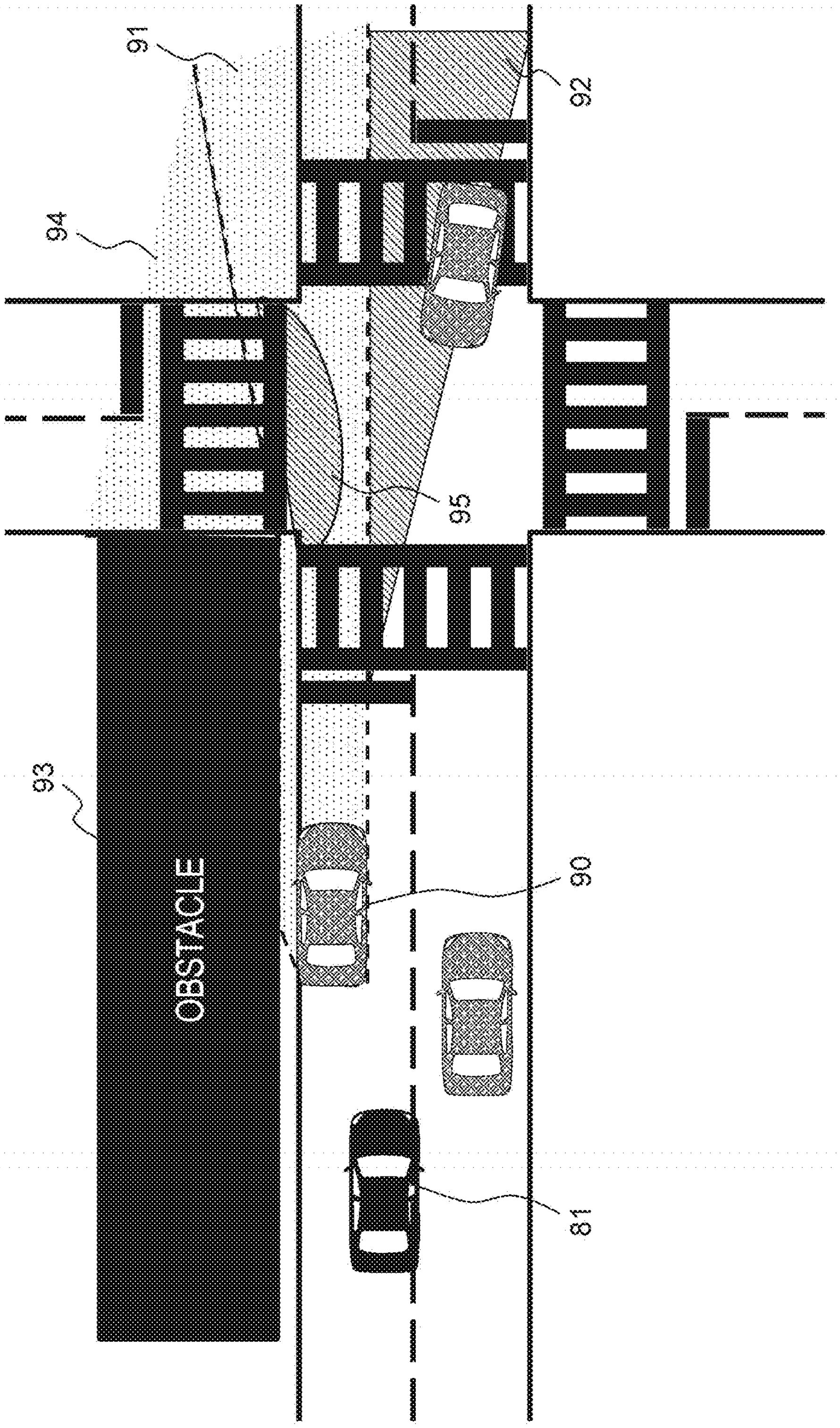
FIG. 9 is a view illustrating an example of another object processed by the electronic control device of the present example.

FIG. 9 is a view illustrating an example of another object processed by the electronic control device 10 of the present example.

As described above with reference to FIG. 8, a blind spot region 91 is generated in front of a preceding vehicle 90 as viewed from the own vehicle 81. The blind spot region 91 is determined in a range excluding an obstacle 93, which is an obstacle object. Since the inside of the blind spot object (blind spot region) 91 cannot be observed, a virtual solid object (preceding vehicle) that can exist in the blind spot region 91 is generated, and association information of the blind spot object 91 and the virtual solid object is recorded in the contained object 2146 of the blind spot object database 214. Thereafter, when changing the lane, the virtual solid object exits from the blind spot region 91 in front of the preceding vehicle 90, and the record of the contained object 2146, which is the association information of the blind spot object 87 and the virtual solid object 88*a*, is deleted. When the contained object (preceding vehicle) exits the blind spot region 91 generated by the preceding vehicle 90, the course of the own vehicle 81 possibly needs to be changed, and therefore, an adjacent lane region 92 in front of the preceding vehicle 90 is calculated as a high risk area.

A roadside building becomes the obstacle 93, hinders observation of the side road crossing from the lateral direction at the intersection, and generates a blind spot region 94. Since the inside of the blind spot object (blind spot region) 94 cannot be observed, a virtual solid object (pedestrian, motorcycle, automobile, or the like) that can exist in the blind spot region 94 is generated, and association information of the blind spot object 94 and the virtual solid object is recorded in the contained object 2146 of the blind spot object database 214. Thereafter, when the virtual solid object exits the blind spot region 94 from the side road, there is a risk of coming into contact with the own vehicle 81, and therefore a region 95 adjacent to the blind spot object 94 is calculated as a high risk region.

As illustrated in FIGS. 8 and 9, the net blind spot region excluding obstacles is determined. An object that enters and exits the blind spot region is managed as a contained object even if the object cannot be observed in the blind spot region, and a potential risk is calculated by predicting that the object exits the blind spot object. An object that can exist in the blind spot region is managed as a virtual solid object, and a potential risk is calculated by predicting that the virtual solid object exits the blind spot object.

As described above, the electronic control device 10 of the present example includes the object recognition unit 13 that recognizes surrounding objects based on external environment information acquired by an external environment sensor, an obstacle object generation unit (obstacle object detection/determination unit 19) that generates an obstacle object regarding an object that generates a blind spot region by shielding observation by the external environment sensor 32 among the recognized objects, and the blind spot object management unit 21 that manages, as a blind spot object, a blind spot region generated by the obstacle object, in which the object recognition unit 13 generates solid object information regarding an object that can enter and exit the blind spot region among the recognized objects, and the blind spot object management unit 21 associates a solid object that has entered the blind spot region with a blind spot object in the blind spot region, and cancels association of a solid object that has exited the blind spot region with a blind spot object in the blind spot region, and therefore it is possible to manage over time the solid object that enters and exits the blind spot region.

Since the blind spot object management unit registers, into a database, the shape of the blind spot region, the size of the blind spot region, the obstacle object that generates the blind spot region, and the solid object that enters and exits the blind spot region, and generates the blind spot object, it is possible to accurately grasp the blind spot region.

Since the electronic control device of the present example includes the risk calculation unit that calculates a potential risk indicating a traveling risk level of a vehicle by using the blind spot object information, it is possible to accurately predict the risk generated by the object hidden in the blind spot region and improve the traveling safety of the vehicle.

Since the electronic control device of the present example includes the blind spot detection unit that calculates a blind spot region excluding a region occupied by the obstacle object by using at least one of information on a building included in a map and a shape of an object recognized by the object recognition unit, it is possible to accurately grasp the size and shape of the blind spot region not including a structure that generates a blind spot region, possible to estimate a virtual solid object included in the blind spot region, and possible to accurately predict an unnecessary potential risk.

Since the blind spot object management unit 21 estimates a virtual solid object contained in the blind spot region based on a size and shape of the blind spot region, and manages the estimated virtual solid object in association with a blind spot object in the blind spot region, it is possible to estimate the solid object contained in the blind spot region, and possible to predict a potential risk generated by the blind spot region. This makes it possible to reduce a prediction with a low risk of running out and suppress it within an appropriate range, and it is possible to suppress a prediction with a low possibility, a sensitive judgement due to an erroneous prediction, and an excessive control.

Note that the present invention is not limited to the above-described example, and includes various modifications and equivalent configurations within the spirit of the appended claims. For example, the above-described example has been described in detail for easy understanding of the present invention, and the present invention is not necessarily limited to those having all the described configurations. A part of the configuration of a certain example may be replaced with the configuration of another example. The configuration of another example may be added to the configuration of a certain example. A part of the configuration of each example may be added to, deleted from, or replaced with another configuration.

Some or all of the above-described configurations, functions, processing units, processing means, and the like may be implemented by hardware by designing with an integrated circuit, for example, or may be implemented by software by a processor interpreting and executing a program for implementing each function.

Information such as a program, a table, and a file for implementing each function can be stored in a storage device such as a memory, a hard disk, and a solid state drive (SSD), or a recording medium such as an IC card, an SD card, and a DVD.

Control lines and information lines indicated are those considered to be necessary for the description, and do not necessarily indicate all the control lines and the information lines necessary for implementation. In practice, it may be considered that almost all the configurations are connected to one another.

The invention claimed is:

1. An electronic control device, comprising:

a computer processing unit (CPU) configured to:

recognize surrounding objects based on external environment information acquired by an external environment sensor;

generate an obstacle object regarding an object that generates a blind spot region by shielding observation by the external environment sensor among the recognized objects; and manage, as a blind spot object, a net blind spot region generated by the obstacle object, the net blind spot region being calculated by a blind spot detection function as a blind spot region excluding a region occupied by the obstacle object using at least one of information on a building included in a map and a shape of the obstacle object, wherein the CPU is further configured to generate solid object information regarding an object that can enter and exit the net blind spot region among the recognized objects, associate a solid object that has entered the net blind spot region with a blind spot object in the net blind spot region, and cancel association of a solid object that has exited the net blind spot region with a blind spot object in the net blind spot region.

2. The electronic control device according to claim 1, wherein the CPU is further configured to register, into a database, a shape of the blind spot region, a size of the blind spot region, the obstacle object that generates the blind spot region, and a solid object that enters and exits the blind spot region, and generates the blind spot object.

3. The electronic control device according to claim 1, wherein the CPU is further configured to calculate a potential risk indicating a traveling risk level of a vehicle by using information of the blind spot object.

4. The electronic control device according to claim 1, wherein the CPU is further configured to:

estimate a virtual solid object contained in the blind spot region based on a size and shape of the blind spot region, and manage the estimated virtual solid object in association with a blind spot object in the blind spot region.

5. A management method of an object observed by an electronic control device, the management method, wherein the electronic control device includes a computer processing unit (CPU) configured to execute a program, and a storage device configured to be accessed by the CPU, the management method of the object includes:

an object recognition procedure in which the CPU recognizes surrounding objects based on external environment information acquired by an external environment sensor, an obstacle object generation procedure in which the CPU generates an obstacle object regarding an object that generates a blind spot region by shielding observation by the external environment sensor among the recognized objects, a blind spot object management procedure in which the CPU manages, as a blind spot object, a net blind spot region generated by the obstacle object, the net blind spot region being calculated by a blind spot detection function as a blind spot region excluding a region occupied by the obstacle object using at least one of information on a building included in a map and a shape of the obstacle object, and a solid object generation procedure in which the CPU generates solid object information regarding an object that can enter and exit the net blind spot region among the recognized objects, and in the blind spot object management procedure, the CPU associates a solid object that has entered the net blind spot region with a net blind spot object in the blind spot region, and cancels association of a solid object that has exited the net blind spot region with a blind spot object in the net blind spot region.

* * * * *